United States Patent
Chan et al.

(10) Patent No.: US 8,548,819 B2
(45) Date of Patent: Oct. 1, 2013

(54) METHOD OF PROVIDING A CONSUMER PROFILE ACCESSIBLE BY AN ON-LINE INTERFACE AND RELATED TO RETAIL PURCHASE OF CUSTOM PERSONALIZED TOYS

(75) Inventors: Yuk Kei Chan, New Territories (HK); Edward Jabbour, Jr., Hastings-on-Hudson, NY (US)

(73) Assignee: Ridemakerz, LLC, Falls Church, VA (US)

( * ) Notice: Subject to any disclaimer, the term of this patent is extended or adjusted under 35 U.S.C. 154(b) by 495 days.

(21) Appl. No.: 12/104,833

(22) Filed: Apr. 17, 2008

(65) Prior Publication Data

US 2008/0263454 A1    Oct. 23, 2008

Related U.S. Application Data

(63) Continuation-in-part of application No. 12/103,808, filed on Apr. 16, 2008, now abandoned.

(60) Provisional application No. 60/912,221, filed on Apr. 17, 2007.

(51) Int. Cl.
  *G06Q 30/02* (2012.01)
  *G06Q 10/10* (2012.01)
  *G06Q 10/06* (2012.01)
  *G06Q 30/06* (2012.01)
  *G06Q 10/08* (2012.01)

(52) U.S. Cl.
  USPC .......................................................... 705/1.1

(58) Field of Classification Search
  USPC .................................................. 705/1.1, 500
  See application file for complete search history.

(56) References Cited

U.S. PATENT DOCUMENTS

| | | | |
|---|---|---|---|
| 2,609,268 | A | 9/1952 | Nye |
| 2,691,724 | A | 10/1954 | Hoffman |
| 2,879,491 | A | 3/1959 | Shapiro |
| 2,973,220 | A | 2/1961 | White |
| 2,980,211 | A | 4/1961 | Richter |
| 3,094,364 | A | 6/1963 | Lingg |
| 3,696,548 | A | 10/1972 | Teller |
| 3,723,675 | A | 3/1973 | Richey |
| 3,924,352 | A | 12/1975 | Goldfarb et al. |

(Continued)

OTHER PUBLICATIONS

"BBW" (Build-a-Bear Workshop, US Securities and Exchange Commission Form 424B4 Prospectus filed Oct. 29, 2004; http://www.sec.gov/Archives/edgar/data/1113809/000095013400401 5959/c86750b4b4.htm; accessed Apr. 22, 2011.

(Continued)

*Primary Examiner* — Jonathan Ouellette
(74) *Attorney, Agent, or Firm* — Miles & Stockbridge P.C.

(57) ABSTRACT

A method for continuing the purchase experience of a personalized semi-custom toy in a follow-up on-line interface experience or in a physical retail experience. The method includes the steps of a consumer assembling a semi-custom toy configuration by selecting from among multiple major component styles and assembling the major component styles selected and selecting additional optional accessories to add to the major components resulting in a semi-custom toy configuration; the consumer inputting identifiers for the selected major component styles and accessories so that an over all toy identifier can be assigned, which is associated with and correlates to the resulting configuration; memorializing the information electronically into a consumer/toy-configuration profile stored in a database having electronic memory for future retrieval and manipulation.

17 Claims, 7 Drawing Sheets

(56) References Cited

U.S. PATENT DOCUMENTS

| | | | | |
|---|---|---|---|---|
| 4,029,024 | A | 6/1977 | Klitzky | |
| 4,183,173 | A | 1/1980 | Ogawa | |
| 4,188,748 | A | 2/1980 | Rich et al. | |
| 4,219,962 | A | 9/1980 | Dankman et al. | |
| 4,236,190 | A | 11/1980 | Hollingshead et al. | |
| 4,360,988 | A | 11/1982 | Schoenfield et al. | |
| 4,488,375 | A | 12/1984 | Cheng | |
| 4,504,239 | A | 3/1985 | Kulesza et al. | |
| 4,530,670 | A | 7/1985 | Ohno | |
| 4,559,022 | A | 12/1985 | Herstein et al. | |
| 4,571,202 | A | 2/1986 | Diebold | |
| 4,820,233 | A | 4/1989 | Weiner | |
| 4,919,639 | A | 4/1990 | Hesse | |
| 4,993,983 | A | 2/1991 | Kurita et al. | |
| 5,195,920 | A | 3/1993 | Collier | |
| 5,314,336 | A | 5/1994 | Diamond et al. | |
| 5,352,147 | A | 10/1994 | Nagel et al. | |
| 5,607,336 | A | 3/1997 | Lebensfeld et al. | |
| 5,746,602 | A | 5/1998 | Kikinis | |
| 6,012,961 | A | 1/2000 | Sharpe et al. | |
| 6,033,285 | A | 3/2000 | Fine et al. | |
| 6,083,104 | A | 7/2000 | Choi | |
| 6,083,267 | A | 7/2000 | Motomiya et al. | |
| 6,171,168 | B1 | 1/2001 | Jessop | |
| 6,206,750 | B1 * | 3/2001 | Barad et al. | 446/268 |
| 6,206,775 | B1 | 3/2001 | Barad et al. | |
| 6,236,305 | B1 | 5/2001 | Martin | |
| 6,319,010 | B1 | 11/2001 | Kikinis | |
| 6,339,763 | B1 | 1/2002 | Divine et al. | |
| 6,364,509 | B1 | 4/2002 | Johnson, III | |
| 6,416,270 | B1 | 7/2002 | Steury et al. | |
| 6,443,796 | B1 | 9/2002 | Shackelford | |
| 6,615,747 | B2 | 9/2003 | Stenflenagel et al. | |
| 6,632,122 | B2 | 10/2003 | Klitsner et al. | |
| 6,645,037 | B1 | 11/2003 | Choi | |
| 6,679,753 | B1 | 1/2004 | Motosko | |
| D488,666 | S | 4/2004 | Mobley et al. | |
| 6,758,718 | B1 | 7/2004 | Morris | |
| 6,773,321 | B1 | 8/2004 | Urquiaga | |
| 6,800,013 | B2 | 10/2004 | Liu | |
| 6,840,839 | B2 | 1/2005 | Rehkemper et al. | |
| 6,918,627 | B2 | 7/2005 | Mataja et al. | |
| 7,033,243 | B2 | 4/2006 | Hornsby et al. | |
| 7,100,968 | B2 | 9/2006 | Mataja et al. | |
| 7,131,887 | B2 | 11/2006 | Hornsby et al. | |
| 7,137,861 | B2 * | 11/2006 | Carr et al. | 446/298 |
| 7,353,993 | B2 | 4/2008 | Fujimoto | |
| 7,905,759 | B1 | 3/2011 | Ghaly | |
| 2001/0041494 | A1 * | 11/2001 | Barad et al. | 446/268 |
| 2002/0061702 | A1 | 5/2002 | Dan et al. | |
| 2002/0061707 | A1 * | 5/2002 | Barad et al. | 446/268 |
| 2002/0074727 | A1 | 6/2002 | Glaser | |
| 2002/0091596 | A1 | 7/2002 | Dudek et al. | |
| 2002/0198791 | A1 | 12/2002 | Perkowski | |
| 2003/0224694 | A1 | 12/2003 | Hoeting et al. | |
| 2004/0043806 | A1 | 3/2004 | Kirby et al. | |
| 2004/0081110 | A1 * | 4/2004 | Koskimies | 370/315 |
| 2005/0154650 | A1 | 7/2005 | McMullen et al. | |
| 2005/0170744 | A1 | 8/2005 | Smith et al. | |
| 2005/0177453 | A1 | 8/2005 | Anton | |
| 2005/0211768 | A1 | 9/2005 | Stillman | |
| 2006/0079149 | A1 | 4/2006 | Proch | |
| 2006/0099882 | A1 | 5/2006 | Eckerman et al. | |
| 2006/0212150 | A1 | 9/2006 | Sims, Jr. | |
| 2007/0028264 | A1 | 2/2007 | Lowe | |
| 2007/0198117 | A1 * | 8/2007 | Wajihuddin | 700/114 |
| 2007/0293124 | A1 * | 12/2007 | Smith et al. | 446/454 |
| 2008/0109313 | A1 | 5/2008 | Ganz et al. | |
| 2008/0163055 | A1 * | 7/2008 | Ganz et al. | 715/706 |
| 2008/0262980 | A1 * | 10/2008 | Weiss et al. | 705/500 |
| 2009/0030808 | A1 * | 1/2009 | Park | 705/26 |
| 2009/0053974 | A1 * | 2/2009 | Domm et al. | 446/454 |
| 2009/0137185 | A1 * | 5/2009 | Zheng | 446/268 |
| 2010/0093434 | A1 * | 4/2010 | Rivas | 463/35 |
| 2010/0273556 | A1 * | 10/2010 | Briggs et al. | 463/36 |
| 2010/0330875 | A1 * | 12/2010 | Severson | 446/454 |

OTHER PUBLICATIONS

"Hobby Town" (Hobby Town USA Website; Wayback machine Internet Archived web page, dated Mar. 2006; http://replay.web.archive.org/20060315184635/http:///www.hobbytown.com/; Accessed Apr. 22, 2011.

* cited by examiner

METHOD OF PROVIDING A CONSUMER PROFILE ACCESSIBLE BY AN ON-LINE INTERFACE AND RELATED TO RETAIL PURCHASE OF CUSTOM PERSONALIZED TOYS

CROSS-REFERENCE TO RELATED APPLICATIONS

This application is a continuation-in-part of U.S. application Ser. No. 12/103,808 filed Apr. 16, 2008, said application is a non-provisional application claiming the benefit of provisional Patent Application Ser. No. 60/912,221 filed Apr. 17, 2007 the disclosures of aforesaid applications are incorporated by reference in their entirety herein.

BACKGROUND OF INVENTION

1. Field of Invention

This invention relates generally to methods of providing on-line retail experiences and, more particularly, to on-line interfaces, which provide follow on on-line retail experiences related to the original purchase.

2. Background Art

There are various on-line retail experiences available to consumers on wide area networks (WAN) such as for example on the internet. Many consumers perform various retail transactions via the internet. For example, consumers have the ability to visit via the internet the web site or URL of a retailer. A consumer, while browsing the web site, can place an order purchasing various items made available. Often the items purchased can be ordered with various options. For example, if a consumer is ordering a personal computer on-line, the consumer may be prompted to select from various optional features to semi-customize the computer to the customers specifications within certain optional constraints. For example, a consumer may select a random access memory (RAM) capacity option of 1 gigabyte or 2 gigabytes. The same may apply for purchasing clothing apparel having various optional colors, sizes and features. The same may apply for toys and other items.

In addition, on-line retail experiences may allow consumers to modify or cancel an order or view the fulfillment status of an existing order. On-line experiences may also allow you to revisit the web site where the item was purchased and purchase additional accessory items to add to the originally purchased item. For example, if a computer is purchased without a DVD formatted disc drive then a consumer can revisit the site to purchase a DVD drive for which the consumer can install or have installed.

Toys are also available for purchase via an on-line retail experience. For example, various categories of dolls can be purchased on-line and the on-line experience may allow the user to select from among various options for each category of doll including skin color, eye color and hair color. Also, the on-line experience may allow the consumer to purchase various accessories for the doll. As an alternative, a consumer may visit the physical retail store and purchase one of various categories of dolls and later visit the web site of the retail store or the actual physical retail store and purchase additional accessory items that are compatible with the original purchase.

Once a consumer has visited a web site and purchased one or more items, it is typical for the on-line interface to prompt the user to register for a billing account and/or register to receive various electronic mail notices relating to promotions, general information and special offers. Registration may also allow for identification with previous purchases.

There are various on-line retail experiences and various physical in-store retail experiences that allow a consumer to semi-customize a purchase item, for example a toy, and revisit later either on-line or at the physical store to purchase accessory items for the previous purchase or purchase a new item from a different category. However, there isn't a continuation of or a direct correlation to the original purchase experience. There is no direct correlation between the identity of each individual consumer, their original purchase experience, the specification of the originally purchased item; and the later on-line or physical retail experience. The customized toy purchased is not provided with an identifier specifically identifying its features and the customer/purchaser, such that the consumer experience with the newly purchased customized toy can be continued. The original purchase experience is not memorialized in a way that the experience can be continued and revisited. Therefore, a better on-line experience is needed that addresses the above short comings.

BRIEF SUMMARY OF INVENTION

The invention is a method for continuing the purchase experience of a personalized semi-custom toy in a follow-up on-line interface experience or in a physical retail experience. The method includes the steps of a consumer assembling a semi-custom toy configuration by selecting from among multiple major component styles and assembling the major component styles selected and selecting additional optional accessories to add to the major components resulting in a semi-custom toy configuration; the consumer inputting identifiers for the selected major component styles and accessories so that an over all toy identifier can be assigned, which is associated with and correlates to the resulting configuration; the consumer selecting a personalized name, or nickname to be assigned to the resulting toy configuration; memorializing the information electronically into a consumer/toy-configuration profile stored in a database having electronic memory for future retrieval and manipulation; and recalling the consumer/toy-configuration profile to continue the original purchase experience. The toy identifier can be an alphanumeric data string having encoded therein as part of the string—body chassis styles, date purchased, member number and etc. . . .

For example this method could be implemented for a modular custom toy vehicle. When a consumer enters a retail space, the consumer, if desirous of purchasing a custom vehicle can be directed by way of retail space layout and/or a customer service representative to a toy vehicle body selection station including a display rack having segregated display channels for displaying vehicle body styles contained in packaging, which can be on major component. At this station the consumer can view the various body styles and select a body style.

The consumer can transport the selected body style to a template sampling station. The sampling station can include a template toy vehicle chassis that has outer dimensions substantially the same as an actual mating toy vehicle chassis for test fitting a selected body. The consumer can place their selected body style over the template in order to get a better visualization of the appearance of the final product. Multiple chassis template styles can be provided that correspond to the various actual chassis styles. For example, there can be a street chassis design (gives the appearance of a standard car chassis) and an off-road chassis design (gives the appearance of an off-road vehicle or raised truck chassis). The chassis can be the second major component.

The consumer can go to a sound module station. The sound module station can include electronically integrated sub systems including a built in speaker system, an electronic storage and playback system for storing and playing back sound clips. The station can also include a selection interface for receiving consumer selections to sample sound clips and corresponding drawers containing sound modules. The selection interface can comprise multiple selection mechanisms, such as for example, buttons that are electronically actuated when depressed. The buttons can be numbered to correspond to stored sound clips. When a button is depressed, the playback system can audibly playback the sound clip through the built in speaker system. The consumer can retrieve a selected sound module from the drawer containing the modules.

The sound module can have a programmable electronic storage medium and controller function. The controller function can be operable to control receipt and storage of sound data and other electronic data for initiation of electronic animation. The data can be stored to the electronic storage medium and a controller can control transmission of data from the module to other peripheral systems. Receipt of the sound data can be through a first connector interfaceable with a personal computing system and where transmission of sound data can be through a second connector interfaceable with said sound module receptacle of the toy vehicle or there can be a single connector for both functions. This feature can allow the purchaser to later continue their purchase experience by purchasing different sound modules containing different control data or sound data so that the sound playback or the animations can be varied.

The toy assembly can be such that the electrical housing portion, which can be adapted to receive the sound module and can be part of a chassis of toy vehicle and/or can be housed with an externally mounted or connected or otherwise associated accessory, such as for example, a toy trailer. The accessory can have a receptacle connector for the sound module similar to that of the chassis of the toy vehicle. The accessory can also have its own power source and speaker system. The accessory can include multiple receptacles for multiple types of sound modules and connectors. The accessory can also have an audio output, such as for example, for a headphone jack. The accessory can also have other interfaces and/or connections for other types of audio electronic systems. The accessory can also have an interface to a personal computing device as well as an interface to the toy assembly. These interfaces can allow the user to access on-line games and other activities to while interfacing with the toy assembly real time to thereby initiate certain toy assembly animations responsive to the on-line game or activity being conducted.

The accessory can have a controller function that is operable to control receipt and storage of sound data and can be operable to interface with the personal computing system to download audio sound clips stored on the personal computing. The data stored on the module can include data other than audio sound data, such as for example other electronic animation control data such as data to control flashing of lights.

The process can include the steps using a personal computing device, such as for example, a personal computer (PC), personal data assistant (PDA) or other like computing device to connect to a local or wide area network (LAN or WAN), such as for example, the internet, to access remotely stored audio sound files and/or data files and to download the files to the personal computing device. Alternatively, a game or activity can be played using the Avatar of the toy assembly. For example, a provider of audio sound clips and/or data files particular designed to function with a given toy design can provide a web site that can be accessed by the toy owner. The web site can provide a functional interface that allows the owner to navigate to, sample, and select files for download. Once selected, the owner can download the file to their personal computing device. Once downloaded the process can include the step of communicably connecting the sound module to the personal computing device by way of a standard interface connector, such as for example, a USB connector.

The sound module can have a controller function, implemented in circuitry and/or firmware, that can communicate with the personal computing device for the purpose of uploading the previously downloaded file to the sound module. The control function can also control the transmission of the data file from the sound module through the connector. The sound module containing an electronically stored audio sound and/or other category of data file can be communicably connected to the toy receptacle. The toy can then access the file on demand. Optionally the owner of the toy can also purchased multiple preprogrammed sound modules that are read only or reprogrammable. The owner can also purchase blank sound modules with upload capability.

Once installed in the receptacle of the toy, the toy can access one or more data files stored on the sound module. The data files can be merely audio files that are stored on the sound module and the toy has a control function to access the data and play back the audio sound clip. Alternatively the data files can include audio files as well as other corresponding control data that the toy controller can access for controlling other toy functions, such as for example, toy lighting and/or movement.

One embodiment of the present invention can include a toy assembly having a data module receptacle with an external facing access port and connector where said data module receptacle connector is communicable with an on-board controller and sound playback system and/or other animation systems. The data module can also include a programmable electronic storage medium, where the on-board controller function is operable to communicate with the data module through the connector when the data module is connected to the data module receptacle connector. The controller function can be operable to control receipt and storage of sound data and other electronic data for initiation of electronic animation. The controller function can retrieve data from the data module and control on-board operations based on the data retrieved. For example, the controller function can retrieve sound clip data and transmit the sound clip data to a play back system for audio playback.

This embodiment can also include an accessory module also having an accessory receptacle with an accessory connector communicable with an on-board accessory controller. The accessory controller can also be communicable with an external computer interface connector, such as for example a standard USB connector, where the accessory controller can be operable to receive information from a personal computing system by way of the computer interface connector. The personal computing system can obtain the information by reading and retrieving the information from a CD ROM or other media or the personal computing can be utilized to access a local or wide area network to retrieve information to be uploaded to the data module. The accessory controller can be operable to upload the received information to the data module. The data module, now containing the uploaded information, can be plugged into the data module receptacle connector, through which the on-board controller can now communicate with and retrieve data from the data module now containing the information uploaded to the data module from the computer The removable sound module purchased initially or subsequently can allow the purchaser to continue their purchase experience through the use of the sound module function.

After purchasing an initial sound module, the consumer can transport the selected body and selected sound module to a component collection station having a storage area for chassis styles for consumer pickup. The component collection station can be constructed to appear like an auto body parts shop. The consumer can at this point obtain the selected chassis style. The chassis styles can include motorized standard car chassis, non-motorized standard car chassis, motorized raised truck chassis and non-motorized raised truck chassis. The consumer can transport all of the selected items to an assembly station having custom tooling adapted to interface and drive an attachment member, which is adapted to attach the vehicle chassis to the vehicle body. The assembly station can also include a timer function that can start and stop a timer in order to time how long it takes the consumer to complete the assembly process.

An accessory station including a display having a display board for displaying accessory items and a work bench for in-store sampling and installing accessories can be positioned proximate the assembly station. The consumer can take the assembled vehicle to the accessory station and try out various accessories in order to make purchase selections. This station can be visited by consumers who have already purchased vehicles during a previous visit to the retail store or are visiting the store just to browse or desire to further customize a vehicle being purchased during a current visit.

The retail store space can also include a personalization station having computer work stations and integral toy garages sized for insertion of the toy vehicle and having a reader operable to scan and interpret an encoded identifier. Each body and/or chassis can include a bar code, radio frequency identifier (RFID), or other encoded identifier that has encoded therein identifying information relating to various features including the selected body style, the color, and the selected chassis type. An encoded identifier can be attached to the vehicle body and/or vehicle chassis. One reason for possibly having an encoded identifier on both the body and the chassis is to separately identify the body and chassis type and features. The encoded identifier can be read and interpreted by the reader and the reader can be further operable for transferring the vehicle body style information obtained from the encoded identifier to the computerized work stations where said work stations can be operable to create an electronic record or profile in memory containing body style information, other vehicle information including accessories and consumer information.

The computerized work station can be designed to receive other vehicle related information input by the consumer including information relating to accessories installed and add the information into the record. The record or profile can be assigned an identifier, such as for example, an alphanumeric designator or RIN (ride identification number), that is directly correlated to the profile and the associated resulting toy vehicle configuration. The RIN can be formatted to have embedded therein a member number, vehicle body and chassis identifier and etc. . . . Also, a graphical caricature or image of the resulting configuration (which can generally be referred to as an Avatar) can be generated and stored in the profile for recalling and viewing in the future.

Once the consumer has completed the original purchase experience, the consumer can electronically visit via an on-line experience a web site the provides the consumer the ability to continue the purchase experience by recalling the profile, viewing the image, modifying the configuration with different accessories and dynamically modifying the image being viewed, electronically communicating an image of the configuration to others, printing the image or ordering professionally printed posters containing the image with selected or original text, purchasing a wholly new configuration or modify the original configuration with other accessories, and previewing and purchasing new sound/data modules.

For example, a modular toy vehicle assembly can be capable of sound playback and various other electronic animations. The invention can include a sound module having a programmable electronic storage medium and controller function operable to control receipt and storage of sound data and other electronic data for initiation of electronic animation to the electronic storage medium and control transmission of sound data.

The toy assembly can be such that the electrical housing portion of the chassis can be adapted to receive the sound module and/or can be housed with an externally mounted or connected or otherwise associated accessory, such as for example, a trailer. The accessory can also have an auxiliary audio output in addition to a speaker output, such as for example, for a headphone jack. The accessory can also have other interfaces and/or connections for other types of audio electronic systems. The controller function that is operable to control receipt and storage of sound data can be operable to interface with the personal computing system to download audio sound clips stored on the personal computing system where said first connector can be a standard data interface connector for personal computing systems, such as for example, a USB type connector. The toy assembly as described above having first and second connectors can alternatively have the first and second connectors combined functionally and physically into one connector, such as for example, a USB type connector. The data stored on the module can include data other than audio sound data, such as for example other electronic animation control data such as data to control flashing of lights.

The process can include the steps using a personal computing device, such as for example, a personal computer (PC), personal data assistant (PDA) or other like computing device to connect to a local or wide area network (LAN or WAN), such as for example, the internet, to access remotely stored audio sound files and/or data files and to download the files to the personal computing device. For example, a provider of audio sound clips and/or data files particular designed to function with a given toy design can provide a web site that can be accessed by the toy owner.

The system can be designed such that when a previous purchaser navigates to a web site having a user interface log in page where the purchaser can enter the RIN number, which will recall the profile such that the appropriate sound modules can be identified for future purchases. The web site can provide a functional interface that allows the owner to navigate to, sample, and select files for download. The data file to be selected can merely be a music data file, for example an MP3 music file of a song by a popular musical artist. Once selected, the owner can download the file to their personal computing device. Once downloaded the process can include the step of communicably connecting the sound module to the personal computing device by way of a standard interface connector, such as for example, a USB connector. This on line option can also include a custom sound mixing and animation function. The interface can provide a means for a consumer to develop their own mixture of sounds and animation that can be downloaded as a data file once the mix is complete. The custom mix can be uploaded to a sound card, which can be plugged into the toy assembly.

The sound module can have a control function, implemented in circuitry and/or firmware, that can communicate with the personal computing device for the purpose of uploading the previously downloaded file to the sound module. The control function can also control the transmission of the data file from the sound module through the connector. The sound module containing an electronically stored audio sound and/or data file can be communicably connected to the toy receptacle. The toy can then access the file on demand. Optionally the owner of the toy can also purchased multiple preprogrammed sound modules that are read only or reprogrammable. The owner can also purchase blank sound modules with upload capability.

Once installed in the receptacle of the toy, the toy can access one or more data files stored on the sound module. The data files can be merely audio files that are stored on the sound module and the toy has a control function to access the data and play back the audio sound clip. Alternatively the data files can include audio files as well as other corresponding control data that the toy controller can access for controlling other toy functions, such as for example, toy lighting and/or movement.

Another on-line example of a continuation of the purchase experience can be the participation in an on-line game or activity utilizing an Avatar of the purchaser's toy assembly where the purchase can utilize their personal Avatar to compete or participate in games or activities individually or with/against other known purchasers and their respective Avatar. A purchaser can access via the internet a secured network by navigating to a web site having a log in user interface. The purchaser can log in by entering an appropriate user identification (for example the RIN) and password.

Once the purchaser has logged in, the purchaser and navigate to various user interface functions. For example the purchaser can view information relating to their type of toy assembly generally, or information relating to a purchaser's member account or status of a placed order. The purchaser can also view information specifically related to the purchaser's RIN number, for example the latest version of their toy assembly Avatar. The purchaser can also navigate to games and activities where the purchaser can enter the Avatar of their toy assembly in the various games and activities. The purchaser can also set up activities and games to compete against another known purchaser and their respective Avatar. This can be performed real time with both purchasers and their respective Avatars participating. The accessory module option of the toy assembly can act as a HUB and enhance this experience by communicably linking the toy assembly to the respective personal computing systems being utilized for the game or activity. The accessory module can communicably link the toy assembly to the respective personal computing system by way of a hard wired or wireless link. This connectivity can allow the on-line game or activity to initiate, by way of the personal computing system, a sound play back or animation of the toy assembly in real time responsive to an event in a game or activity.

As a further option of this expansion of the on line experience, the RIN of a purchaser can be placed on a sound module along with other firmware that allows the purchaser to connect the sound module to an accessory module, which is in turn connected to a personal computing system, and automatically access the purchaser RIN account without having to key in information manually by way of a log in user interface.

These and other advantageous features of the present invention will be in part apparent and in part pointed out herein below.

BRIEF DESCRIPTION OF THE DRAWINGS

For a better understanding of the present invention, reference may be made to the accompanying drawings in which.

Figure 1:
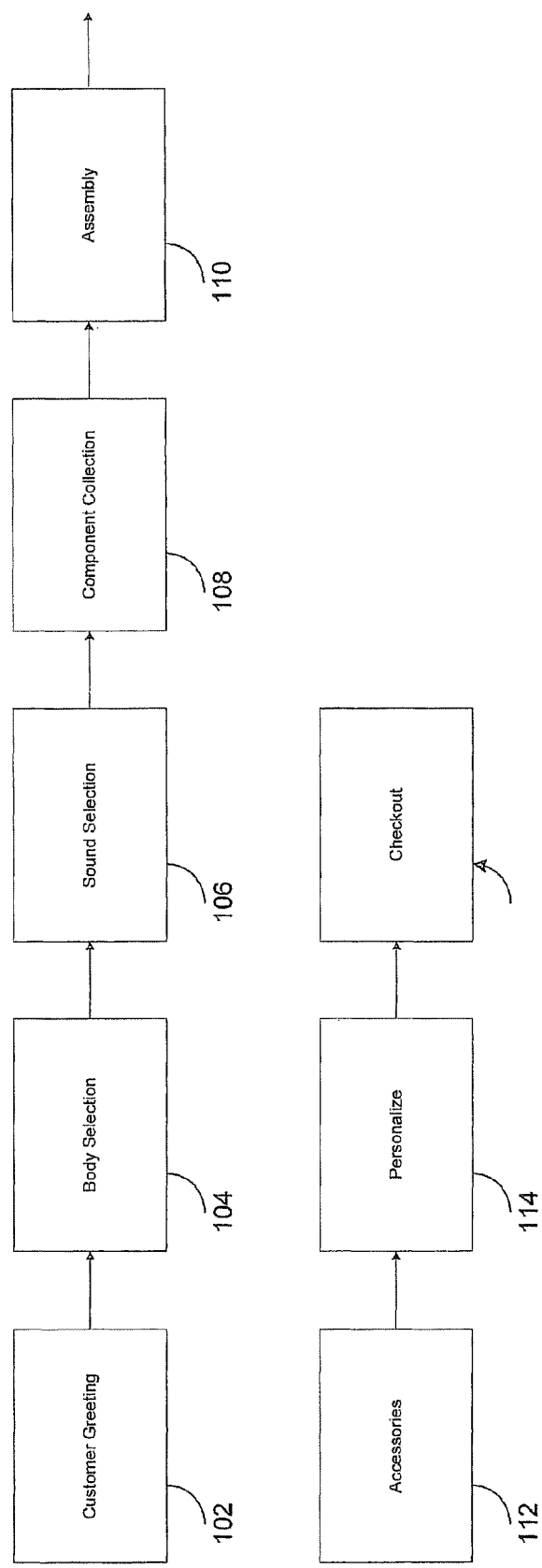
FIG. 1 is a process flow of the original purchase business.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIGS. 1-6 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a method for continuing a retail purchasing experience teaches a novel method for continuing the purchase experience for a consumer's purchase of a semi-custom toy assembled and customized by the consumer. The method includes creating an individualized profile or record memorializing the purchase, customization and personalization experience when assembling, customizing and purchasing a semi-custom toy. A unique identification number can be assigned to the profile for future recall of the record. The purchasing or customizing experience can continue on-line or in a physical retail store by recalling the profile.

The details of the invention and various embodiments can be better understood by referring to the figures of the drawing. Referring to FIG. 1, a process flow of the original purchase business model 100 is shown. The process flow shows various stages of the purchase experience as a consumer smoothly transitions between the stages of customizing, assembling, accessorizing and personalizing a modular toy vehicle designed based on their selections. The original purchase experience can be accomplished in a physical retail store or by navigating among on-line user interface pages or virtually via an on-line experience by visiting a web site. For the on-line experience, graphical user interface technology well known to those skilled in the art can be utilized to simulate a physical in-store retail purchase experience. As an alternative the on-line virtual in-store experience can be a 3D experience. The consumer's transition between the stages or stations can be directed by the retail space floor plan and/or a customer service representative or by the graphical user interface in an on-line environment. The physical retail space is described herein, but as indicated above the same can be accomplished on-line using a graphical user interface that allows the consumer to select each stage by navigating among user interface pages and view and select the options made available at each stage. Also, as mention, a virtual tour can be utilized. The assembled custom vehicle can be graphically presented automatically based on selections and viewed or there can be some manual interactions utilizing various computer interface control devices such as for example the mouse for selection and moving graphically presented items.

The Introduction/Greeting step is reflected by functional block 102. Upon entering the retail space, or by navigating to the greeting page on-line, customers can be familiarized with the purchase experience and can be started in the process. Customers can be directed to pass through a simulated "Shop" door (garage like, auto-body/mechanic shop door) and into the toy vehicle body selection station.

The toy vehicle body selection stage is indicated by functional step 104, where a wide selection of vehicle body styles can displayed, in various colors and degrees of paint finish. For example, each vehicle can be offered in a certain number of color options including solid colors and "custom" paint finishes. Bodies with extensive painting and detailing can carry a higher retail price than the more basic solid colored vehicle bodies. The stock configuration of a toy vehicle can comprise of the vehicle body on a car or "street" chassis, four stock tires, four stock rims and a fifteen to thirty second sound chip or sound module which plays a mix of car sound effects and music. The various body styles can have uniform chassis interface mating designs such that all body designs can mate with the same chassis design.

Once customers select their vehicle body, they can proceed to a chassis template sampling station 209. Here customers can see how their selected vehicle body will appear on various chassis styles, for example, both a "street" chassis and a "monster"/off-road or raised truck chassis. The "street" chassis can be considered a stock item and therefore included in the base price of the vehicle. The "monster" chassis can carry an additional charge.

The customer can proceed to a sound module selection station 106, where customers can have the option of listening to and selecting additional sound modules for their vehicle in addition to a standard stock sound module, which can be provided as part of the standard purchase. For example, in addition to the sound module that is included with a standard purchase, there can be a plurality of additional sound choices, and each can be for example 30 seconds in length, which can be purchased separately. The sound module selection station can be designed, for example, like a kiosk that resembles a speaker display similar to those typically seen in car audio departments or stores. By selecting buttons on a display, customers can hear the full 30 second playback from each chip. However, the file can be more than a 30 second playback, for example the file can contain a full MP3 format version of a popular song.

The customer can select the actual chassis to be purchased at the component collection station step 108. The customer can then proceed to the assembly step 110, performed at the assembly station. In the physical retail experience they can also be introduced to the timed assembly Pit Challenge—a timed competition where a consumer can take part in an assembly process time competition.

The consumer can start and stop a timer made available at the station, that can allow the assembly time of each consumer to be timed. A display can be provided which shows the elapsed time. A display can also be provided listing the names of the consumers with the fastest assembly times. The timed assembly competition can be referred to as the RZ Pit Challenge where a timed competition is conducted in which customers compete against the clock to see how quickly they can assemble their vehicle. In order to assemble the vehicle, consumers can use a powered screwdriver or powered wrench with a special bit to drive the attachment member, such as for example as a threaded bolt, to quickly and easily assemble their vehicle. The wheel assembly is a simple snap-on process that requires no tools. Immediately prior to assembly, customers will press a button to activate a stopwatch that is built into the assembly table . . . and will again hit the button to stop the timer when they have finished assembling their car. Their time/score is recorded onto a card by the Pit Challenge Crew Member, service representative, and handed to the customer. Alternatively the Pit Challenge can be automated to provide print out of timed scores. The Pit Challenge would not be available for an on-line purchase experience.

At another station in the process, the personalize station, the customer can be prompted to enter their time in the computer in order to receive their RZ Pit Challenge score and pit ranking to be saved as part of the profile. With their time card and assembled toy vehicle back in their basket, the customer can be directed to the customize accessory station to view the various customizing accessories and decorating options.

A step in the process can be the accessorizing step 112 where customers can move through an accessory station, including a display having a display board for displaying accessory items. Several displays of aftermarket accessories to customize and decorate their modular toy vehicle, such as for example—Rims, Tires, Exterior Accessories and Decals. Instructional displays can be provided to inform customers of the locations of the universal accessory mounts and to provide visual and written instructions on how to install the accessories at those locations on the vehicle.

Customers can decorate and detail their cars with a wide selection of decals. The accessories can be designed to fit all vehicles purchased in the store and can be interchangeable between vehicles. Accessories can be attach to the front, sides and rear of the vehicles via a tab-slot system and to the roof and hood of the via hidden magnets. For example, the accessories can include hood ornamentations (for example hood scoops), roof ornamentations (for example emergency vehicle lights), rear trunk ornamentations (spoilers), tail pipes, side pipes and various other items.

A step in the process can be the personalize step 114 where a customer is directed to move through a personalization station having computerized work stations and integral toy garages sized for insertion of the toy vehicle and said garages having a reader operable to read and/or scan and interpret an encoded identifier where said readers are communicably linked to the computerized work station. The readers can be for example optical readers for scanning and interpreting bar codes or RFID readers. Each vehicle chassis and body type can have an encoded identifier attached that provides specification of that type body and chassis. The customer can also be prompted to input additional information for saving in a profile that can later be retrieved. Packaging for accessories purchased can also have encoded identifiers on one of the exterior surfaces. Packaging for purchased accessories can also be scanned and/or read by the reader and the accessory information can be added to the profile. It is at this stage that an Avatar of the toy assembly can be generated, displayed and stored for future access. These profiles created can periodically be uploaded from the local personalize station to a centralized.

The toy garages can have an integral reader for reading the encoded information. The personalize station can consist of several computer workstations where customers register their vehicle. Customers can enter information about themselves (including names, nicknames, Email Address, Street Address, date of birth, and etc. . . . ) and about their vehicle to create a vehicle Title with its own unique R.I.N. (Ride Identification Number) and personalized License Plates for their vehicle. For example, if the customer has added accessories at the accessorizing station, the customer can enter the accessory information at this point. Entry of accessory information can be performed by scanning identifiers on the packaging of the accessory. The computing system can also be equipped to display a visual depiction of the customized vehicle. A color printout or wall size poster can also be provided. The customer can view now and later on-line an Avatar and forward the image via Email to others. This R.I.N. number can later to used to access information about that specific vehicle online at web site and to gain special access to online activities and games. The consumer can also have the option to give the vehicle a name. For example, the consumer can select a name for a personalized license plate. Embedded within the RIN number format can be the body style number, chassis style number, point of sale identifier (retail store ID), date of purchase, transaction number and date of birth, in order to create a unique RIN number.

The personalize station can comprise several computer workstations where customers register their toy vehicle. For the physical retail experience, customers can be prompted to "park" their vehicle in their toy garage, or "carport" that is attached to the left or right side of the workstation. The garage can house an internal laser scanner that scans the barcode sticker that is affixed to the body of each vehicle. Other encoded tags and readers can be utilized. The barcode identifies the model and color of the vehicle. Additionally customers are asked to identify the type of chassis they selected and which rim design they chose to put on their vehicle. As this data is captured, the computer can be operable to build an image of the customer's vehicle on the screen; body, color, chassis, rims. This same process is used to create the vehicle's unique RIN (Ride Identification Number). Customers can then be prompted to enter information about themselves in order to complete the creation of a vehicle Title and personalized License Plates. This registration process and RIN number can later to used to access information about that specific toy vehicle online at a designated web site and to gain special access to online activities and games. During an online experience, the various selections made by the consumer can be captured and stored as part of the profile.

Figure 2:
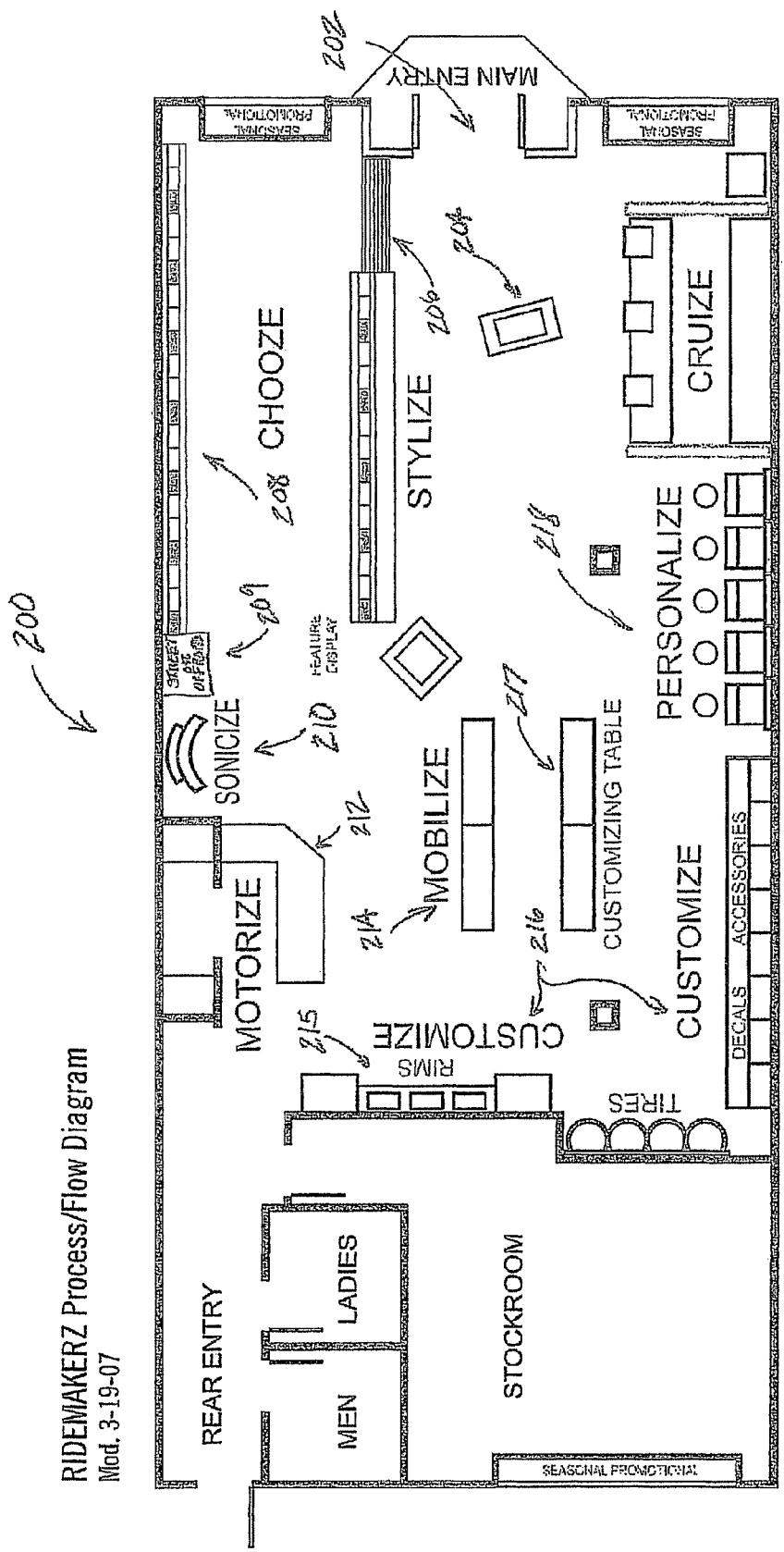
FIGS. 2, 2A, 2B are illustration of retail flows.
Figure 2A:
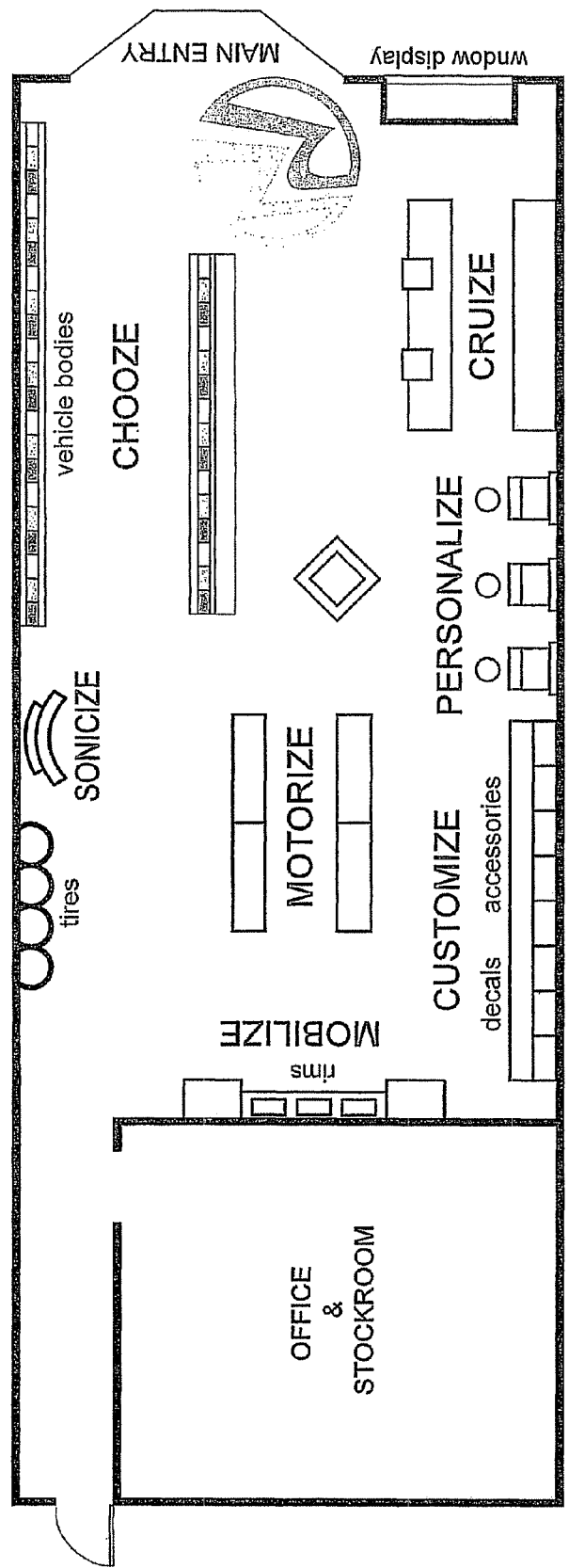
Figure 2B:
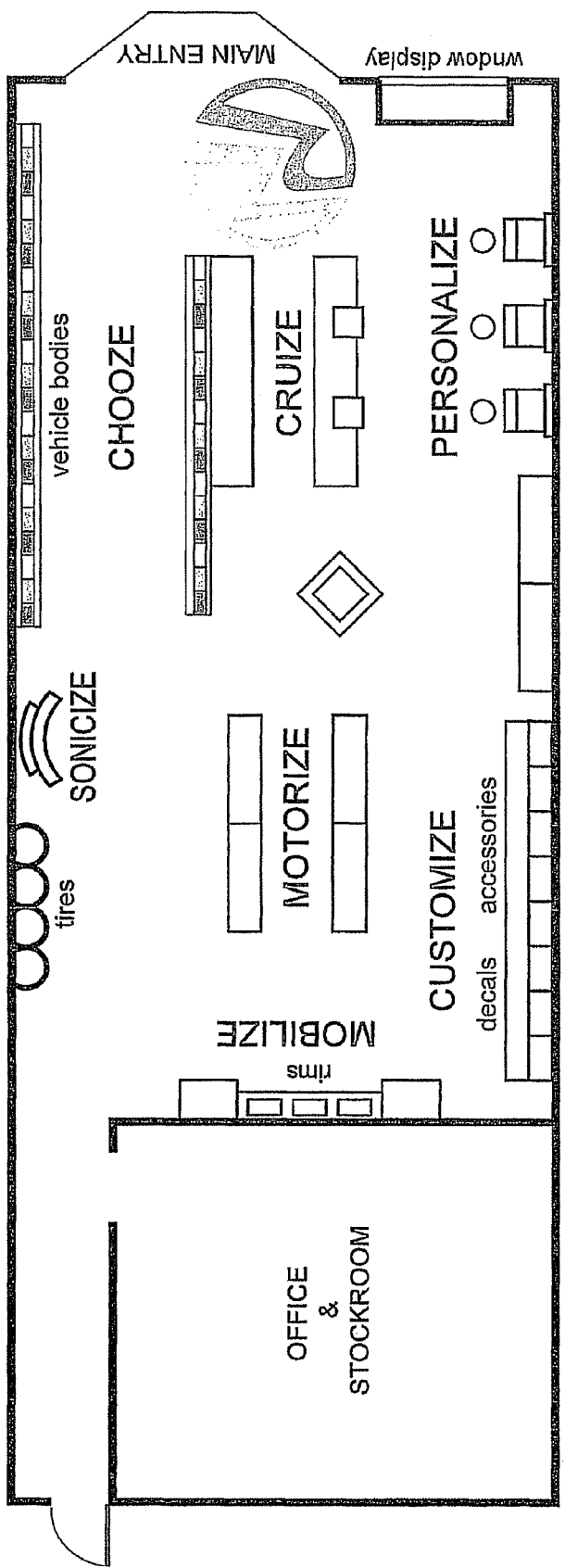

Referring to FIGS. 2, 2A and 2B, optional retail space flows are provided. Referring to FIG. 2, an overhead plan view of the retail floor layout 200 is shown. Various stations can be strategically placed within the floor plan in order to provide a smooth process flow as well as providing an enhanced customer experience. Various fixtures and displays can be placed throughout the retail space to give the retail space the look and feel of an auto mechanic's shop or garage. The primary stations can be placed along the perimeter of the retail space in order to control customer traffic moving throughout the retail space. The retail space floor plan, display construction and arrangement can be designed to create a customer flow path that directs the customer along a path adjacent the various stations in a manner conducive to the selection, assembly, customization and personalization/registration of the vehicle for purchase. A customer can enter through an entrance 202 and proceed to a greeting station that can be proximately located with respect to the entrance. At the greeting station 204, a customer service representative can provide instructions to the customer as well as directing them to the appropriate station. The positioning of the greeting station and the entrance 206 within the retail space floor plan tends to channel the customer to the vehicle body selection station.

The customer service representative can direct a customer through an entrance 206 to the entrance of the customization experience. The toy vehicle body station 208 is shown against a side wall of the retail space proximate the entrance to the retail space and the greeting station. Included in the selection station 208 is a template sampling station 209 provided to allow the customer to decide on a chassis style. Adjacent the selection station is a sound module station 210 where the customer can decide on a sound module selection. The sound module station is also positioned against one of the side walls of the retail space. Adjacent the sound module station against a side wall is the component collection station 212 where a customer can receive the selected chassis. This portion of the retail space floor plan labeled in FIG. 2 as the CHOOZE, SONICIZE and MOTORIZE areas for illustrative purposes is arranged and designed to create a customer flow path that directs the customer along a path adjacent the various stations in a manner conducive to the selection and assembly process.

The assembly station 214 is shown at a location proximate the component collection station 212 toward a central area of the retail space. The customer can assemble the modular vehicle at the assembly station. The accessory station 216 is shown positioned against a rear wall of the retail space. The accessory station can provide various accessories to further customize the modular toy vehicle. In addition, the accessory station can provide full size rims on display 215 for the customers' viewing. The customers can select from these rim designs on display. The play sized version of these full sized rims can be available for purchase. The accessory station 216 can provide a workbench 217 for installation and sampling of the various accessories. The Accessory stations 215 and 216 can be arrange in a more parallel arrangement to create a channel directed toward or about the Assembly station 214. The areas labeled MOBILIZE and CUSTOMIZE can be designed to be more integral or sequential.

The personalized station 218 can be arranged against a side wall of the retail space. The personalized station can include multiple computer work stations having integral toy garages sized for insertion of the toy vehicle where the toy garage has a reader operable to scan and interpret an encoded identifier attached to the vehicle. The checkout station 220 can be positioned against a side wall proximate the entrance of the retail space.

FIGS. 2A and 2B, provide illustrations of alternative floor plan flows. Primarily the only change in flow plan flow is the combining of the Motorize Station and the Mobilize station.

Figure 3:
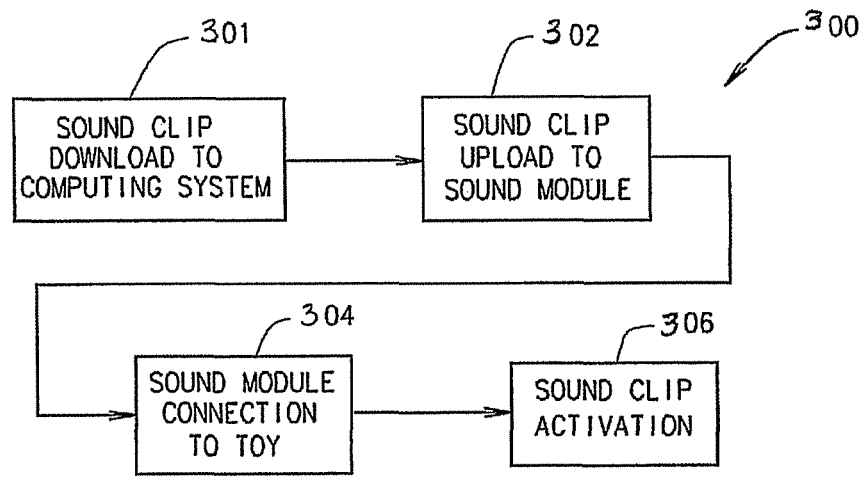
FIG. 3 is a functional flow diagram showing the process of downloading to a sound module and installing a sound module is shown.

Once the consumer has completed the personalized station process, a profile can be completed and stored for subsequent recall to continue the original purchase experience on-line or in a physical retail store. Once a profile has been created, it can be recalled for subsequent purchases, including sound modules. The sound module function can be a useful tool for continuously updated the toy assembly sounds and animations. Referring to FIG. 3, a functional flow diagram showing the process of downloading to a sound module and installing a sound module is shown. The functional flow diagram 300 includes a first functional block 301 representing the personal computing system download function. This functional step is representative of a user utilizing their personal computing system, such as for example a personal computer to access via a wide area network or local area network a remote database containing data files for download. The user can access for example a website via the internet. Once the user accesses the website, a user interface can be provided that allows the user to navigate to a data file and download the data file to their personal computing system. Various type data files can be made available by category based on compatibility with certain toy functional capabilities. For example, certain data files may contain control data for flashing lights of the toy in a certain sequence, however, this function may only be compatible with certain toys.

Once the data file has been properly downloaded and stored on the personal computing system, then the user can begin the upload process. The functional block 302 is representative of the upload to sound module function where the user accesses the data file now residing on the personal computing device and then uploading the data file to the sound module. The user interface on the personal computing system can provide the appropriate prompts for selecting and uploading the desired data files. In order to perform the upload function, the user can communicably connect the sound module to the personal computing system by way of interface connection. The sound module can be equipped with a standard interface connector for communicating with a personal computing device such as a personal computer. The standardized connector can be a standard USB connector that can be connected to a personal computer through which a data file can be uploaded to the sound module.

The data file can include sound clips as well as other data formatted in a fashion to be utilized as control data by a target toy device. Once the data file has been uploaded to the sound module, the sound module can be disconnected from the personal computer and utilized in the target toy device. A functional block 304 is representative of communicably connecting the sound module to an external receptacle of the toy device. The owner can take the sound module and plug it into an external receptacle located on the toy device. The external location of the receptacle should be readily accessible by the user and provides for easy insertion of sound module to provide a communicable connection. Once the sound module has been inserted into the receptacle, the toy can now access the data file contained on the sound module. As an alternative to uploading a data file by way of a personal computing device, the owner can purchase pre-programmed sound modules for insertion into the sound module external receptacle of the toy. In order to access or activate the data files contained on the sound module, the owner must provide the appropriate input which could include depressing a button or switching a switch that is located on the toy device or remotely selecting a function. The activation of the data file contained on the sound module is represented by a functional block 306.

Figure 4:
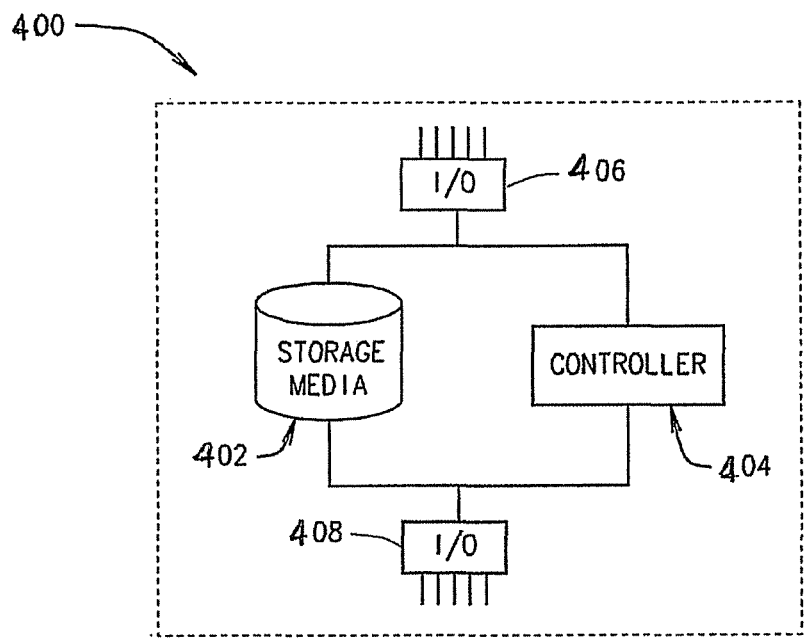
FIG. 4 is a functional block diagram of the sound module is shown.

Referring to FIG. 4, a functional block diagram of the sound module is shown. The sound module 400 can include various functional components. Primarily, the sound module should include a storage media or electronic storage media for storing a data file containing for example audio sound clips or other control data files. The electronic storage media 402 can be configured to be readily accessible by the control function 404 of the sound module. The controller function can be implemented by way of firmware and/or electronic circuitry. The controller function can be operable to control the receipt of control signals and data by way of I/O connector 406 as well as transmit data and control signals by way of the same connector. Optionally, the control module can have a second optional I/O connector 408 such that there is a dedicated I/O connector for receipt of data files and for control signals relating to the storage of information and a separate connector related to the transmission of data files from the sound module and the related control signals.

When the sound module is connected to a personal computing device, the sound module and the personal computing device can communicate through an I/O connector to upload data files to the sound module. When the sound module is communicably inserted into the receptacle of the toy, the control function of the toy can access the data files on the sound module. The consumer's vehicle profile once created can be retrieved at a later time to continue the experience.

Figure 5:
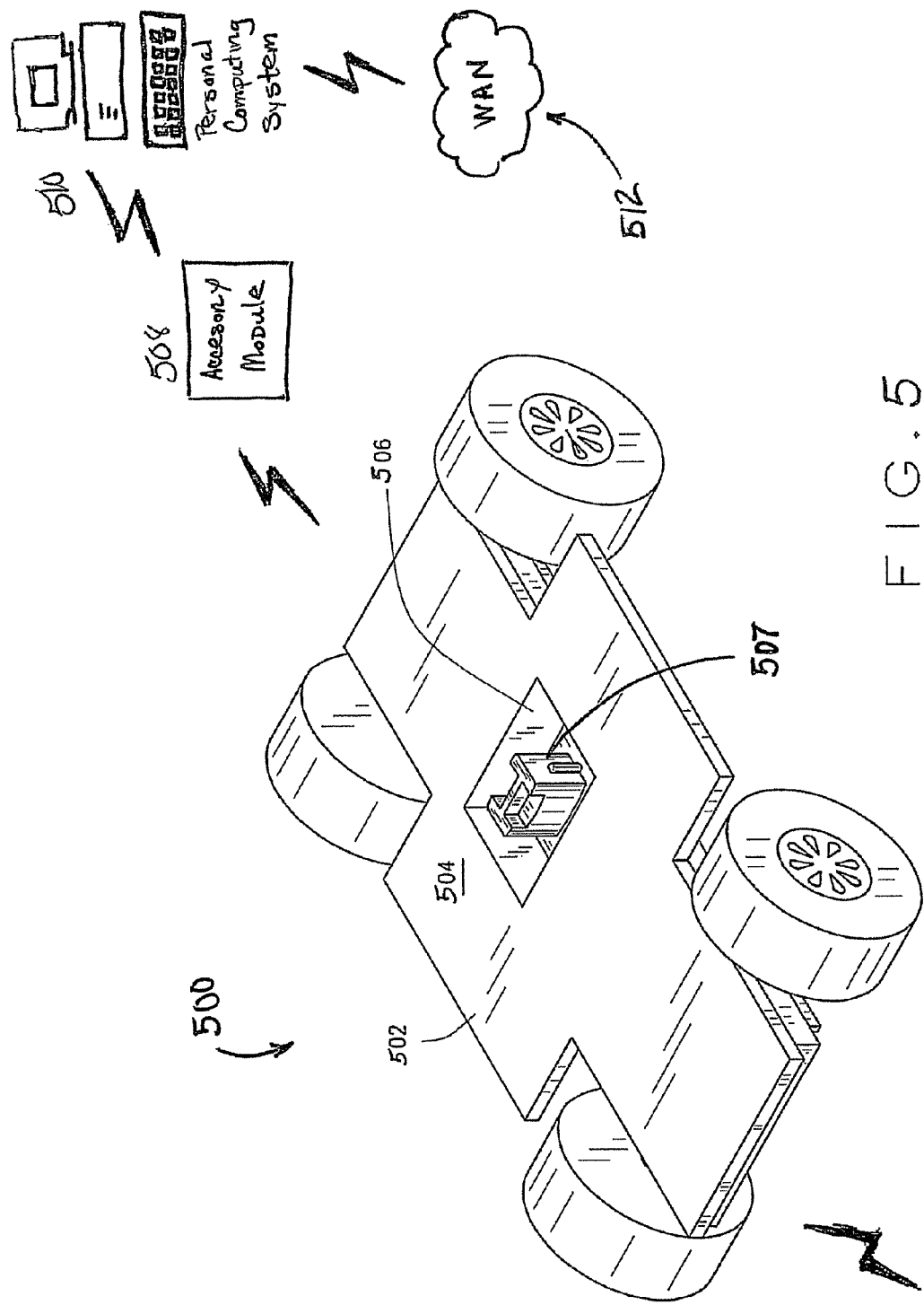
FIG. 5 is an illustration of a toy assembly with sound module installed.

Referring to FIG. 5, a toy assembly 500 is shown. FIG. 5 illustrates the toy assembly as a toy vehicle chassis 502 having a recessed area 506 wherein a sound module 507 is installed such that it is recessed below the surface 504. FIG. 5 also illustrates an accessory module 508, which can provide connectivity to a personal computing system 510 having access to a wide area network 512 such as for example the internet. The accessory module can act as a HUB for the toy assembly providing connectivity to a computing device. The sound module is shown plugged into the toy assembly, however, optionally the sound module could be plugged into the accessory module having a sound module port. This HUB configuration and allow the computing system to access information contained on the sound module, such as for example the RIN number. A purchaser can access the internet via a computing system and navigate to a web site, which provides a login user interface. Once the RIN has been accessed either automatically by way of the HUB interface or by manual entry, the purchaser can access the profile correlating to the RIN. The purchaser can view and modify the toy assembly design thereby creating a revised Avatar that can be stored for future access. The purchaser can also access various games and activities that relate to the toy assembly. For example, in the case of a toy vehicle, an interactive car racing game can be accessed by the purchaser. The purchaser can enter their personal Avatar based on their RIN profile into the racing game to compete against other generic Avatar's randomly selected by the gaming engine. Alternatively the purchaser can arrange for a racing game scenario where the purchaser and purchaser's Avatar can compete against the Avatar's of other known purchaser's, for example friends. Multiple purchasers and their respective Avatars can compete real time in an on-line environment where each of the purchasers are remotely located with respect to each other.

Figure 6:
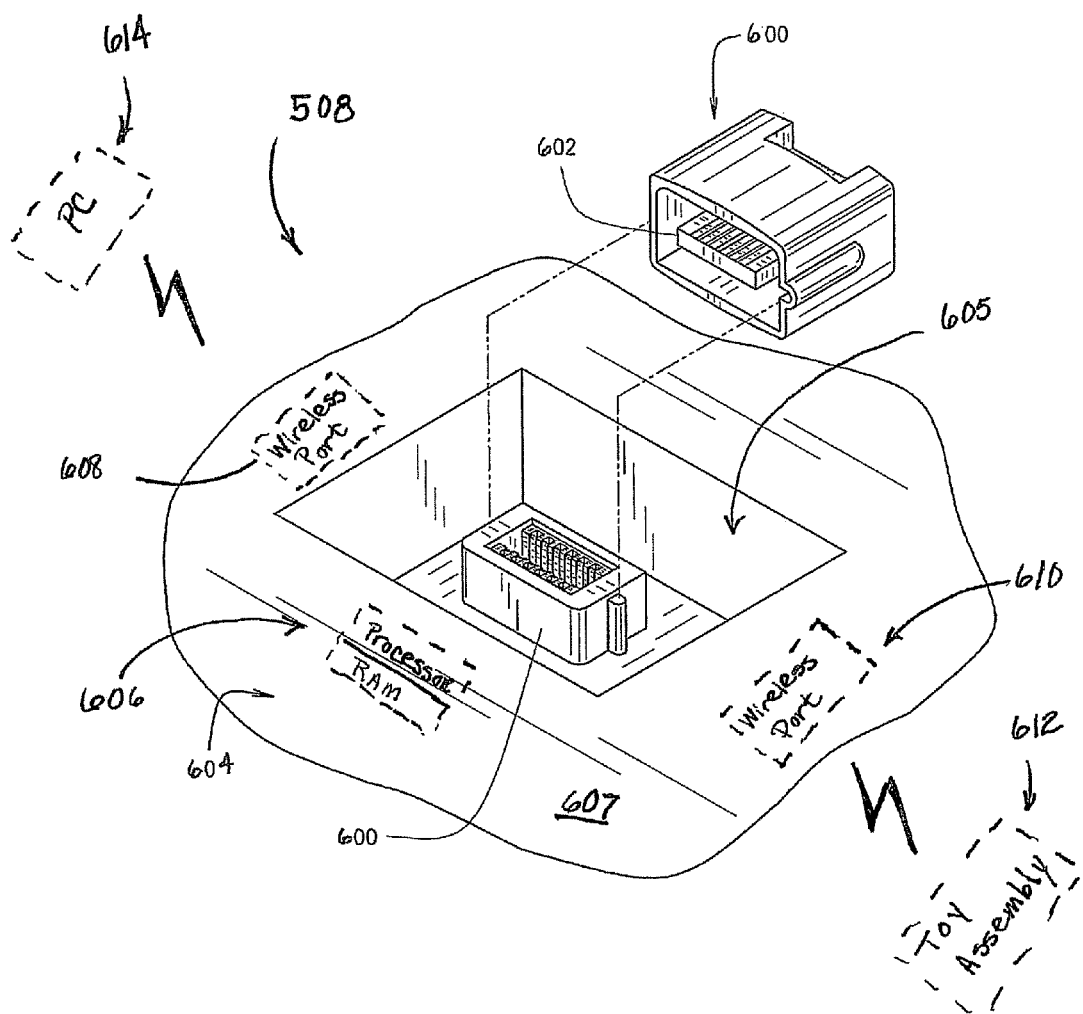
FIG. 6 is an illustration of a accessory module with a sound module installed.

Referring to FIG. 6, an illustration of an accessory module or HUB 508 is shown. The accessory module can have a port adapted to receive a connector 602 of a sound module 600 operable to communicably connect the sound module to the accessory module. The accessory module can optional have multiple ports for receiving and communicating to multiple sound modules. This configuration can allow the computing system to access multiple RIN numbers simultaneously, which can be utilized when multiple purchasers are accessing on-line games or activities through one computing system. Therefore, multiple purchasers can congregate at one location where there is a HUB having multiple ports and a computing system 614 having access to the internet. The accessory module 508 can have a main chassis 604 having a recessed area 605 where the portal can be located, such that the sound module is recessed below an exterior surface 607 of the main chassis.

The accessory module 508 can have an on-board Processor and RAM 606 for controlling operation. The accessory module can also have one or more wireless ports to a toy assembly and one or more wireless ports to the personal computer. Information can be retrieved from the sound module and uploaded to a sound module as described above. The on-line system of the present invention for continuing the initial purchasing experience by retrieving profile information can be implemented utilizing known software and hardware techniques. The accessory module can have wireless connectivity to a personal computing device 614 and to a toy assembly 612 by way of wireless ports 608 and 610 respectively. The accessory module can also have multiple wireless ports for multiple computing system connectivity and multiple wireless ports for multiple toy assembly connectivity.

The HUB configuration and the connectivity between a toy assembly and the computing system can allow the on-line gaming activity to initiate animation functions of the toy assembly, such as for example playback of music or flashing lights, by sending real time signals from the gaming engine corresponding with a real time gaming event to the toy assembly by way of the computing system and the HUB. The toy assembly can perform various animations and movements responsive to a gaming event. The wireless connectivity of the HUB can be Bluetooth, IR or some other wireless format. The connectivity can also be hard wired.

The various examples shown above illustrate a novel method for providing a consumer profile for a custom vehicle. A user of the present invention may choose any of the above methods, or an equivalent thereof, depending upon the desired application. In this regard, it is recognized that various forms of the subject method could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A method of providing a user with a toy purchasing experience, the method comprising:
   providing a customized toy assembling area allowing the user to assemble a customized toy by selecting from a plurality of toy styles and optional accessories;
   providing electronically readable identifiers that identify the selected toy style and optional accessories;
   reading the electronically readable identifiers at a first computer and generating an electronic profile for the user based on the readable identifiers, wherein the electronic profile comprises an Avatar, wherein the Avatar is a computer generated image of the customized toy that is based on the selected toy style and optional accessories;
   providing the electronic profile to the user at a second computer;
   receiving an indication that the customized toy is coupled to the second computer through a communication port on the customized toy;
   providing an on-line game that comprises the Avatar; and
   in response to activity in the on-line game, initiating animation functions on the customized toy, wherein the animation functions are performed by the customized toy while coupled to the second computer.

2. The method of claim 1, wherein the activity comprises remotely competing against a second Avatar based on a second customized toy.

3. The method of claim 1, wherein the animation functions comprise at least one of sound, lights or movement.

4. The method of claim 1, where the customized toy is a customized toy vehicle and the plurality of toy styles includes a toy vehicle body selected from among various style bodies assembled to a toy vehicle chassis selected from among various toy vehicle chassis styles.

5. The method of claim 1, where the electronically readable identifiers are encoded bar codes and the reading the identifiers comprises electronically scanning the encoded bar codes.

6. The method of claim 1, where the electronic profile includes an alphanumeric nickname entered.

7. The method of claim 1, where providing the electronic profile comprises electronically retrieving and graphically displaying the Avatar.

8. The method of claim 1, where providing the electronic profile comprises providing allowing ordering additional accessories and modifying the profile based on the additional accessories.

9. The method of claim 1, where providing the electronic profile comprises electronically transmitting a data copy of the Avatar to another party.

10. The method of claim 1, where the optional accessories selected includes a sound module containing audio file data and wherein the customized toy includes a receptacle for connecting to the sound module and a controller and playback system for accessing and playing back the audio file data.

11. The method of claim 10, further comprising accessing over a wide area network audio file data for uploading to the sound module.

12. An apparatus that provides a user with a toy purchasing experience, the apparatus comprising:
    a reading device for reading electronically readable identifiers from a customized toy that is assembled at a customized toy assembling area that allows a user to assemble the toy by selecting from a plurality of toy styles and optional components, wherein the electronically readable identifiers identify the selected toy style and optional accessories;
    a processor that generates an electronic profile for the user based on the readable identifiers, wherein the electronic profile comprises an Avatar, wherein the Avatar is a computer generated image of the customized toy that is based on the selected toy style and optional accessories;
    a communication device for providing the electronic profile to the user at a second computer;
    an interface device coupled to the customized toy, wherein the interface device is adapted to couple the customized toy to a computing system;
    wherein the processor initiates animation functions on the customized toy through the interface device in response to activity in an on-line game that comprises the Avatar, wherein the animation functions are performed by the customized toy while coupled to the second computer.

13. The apparatus of claim 12, wherein the activity comprises remotely competing against a second Avatar based on a second customized toy.

14. The apparatus of claim 12, wherein the animation functions comprise at least one of sound, lights or movement.

15. A computer readable medium having instructions stored thereon that, when executed by a processor, causes the processor to provide a user with a toy purchasing experience for a toy that is assembled by allowing the user to select from a plurality of toy styles and optional accessories, the providing comprising:
    reading electronically readable identifiers at a first computer, wherein the electronically readable identifiers identify the selected toy style and optional accessories;
    generating an electronic profile for the user based on the readable identifiers, wherein the electronic profile comprises an Avatar, wherein the Avatar is a computer generated image of the customized toy that is based on the selected toy style and optional accessories;

providing the electronic profile to the user at a second computer;
receiving an indication that the customized toy is coupled to the second computer through a communication port on the customized toy;
providing an on-line game that comprises the Avatar; and
in response to activity in the on-line game, initiating animation functions on the customized toy, wherein the animation functions are performed by the customized toy while coupled to the second computer.

16. The computer readable medium of claim 15, further comprising initiating animation functions on the customized toy through a coupling of the customized toy to the second computer.

17. The computer readable medium of claim 16, wherein the animation functions comprise at least one of sound, lights or movement.

* * * * *